(12) United States Patent
Takayanagi et al.

(10) Patent No.: US 6,417,275 B2
(45) Date of Patent: Jul. 9, 2002

(54) PROPLYLENE-BASED COPOLYMER COMPOSITION

(75) Inventors: Kenjiro Takayanagi; Tatsumi Tsuji; Shigeo Mizukami, all of Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/731,480

(22) Filed: Dec. 6, 2000

(30) Foreign Application Priority Data

Dec. 7, 1999 (JP) ............................................. 11-347706
Dec. 15, 1999 (JP) ............................................. 11-355369

(51) Int. Cl.⁷ ........................ C08L 23/00; C08L 23/04; C08L 23/10; C08L 23/24; C08F 210/00
(52) U.S. Cl. ...................................... 525/191; 525/240
(58) Field of Search .................................. 525/191, 240

(56) References Cited

U.S. PATENT DOCUMENTS 5,296,548 A * 3/1994 Covezzi et al. ............. 525/322
5,302,454 A * 4/1994 Cecchin et al. ............. 428/402
6,294,611 B1 * 9/2001 Takayanagi et al. ........ 525/191

FOREIGN PATENT DOCUMENTS

| EP | 0 483 523 A1 | 5/1992 |
| EP | 0 674 991 A1 | 10/1995 |
| EP | 0 700 944 A2 | 3/1996 |

OTHER PUBLICATIONS

Search Report fro European Patent Office dated Aug. 10, 2001 re Application No. EP 00 12 6442.

* cited by examiner

Primary Examiner—Nathan M. Nutter
(74) Attorney, Agent, or Firm—David G. Conlin; John R. Alexander; Edwards & Angell, LLP

(57) ABSTRACT

A propylene-based copolymer composition comprises:

10 to 60% by weight of a polymer component (A) comprising propylene as a main component and having an isotactic index of not less than 90%; and 40 to 90% by weight of a copolymer component (B) comprising propylene and other α-olefin having not more than 8 carbon atoms and containing propylene and ethylene as essential components, the copolymer component containing cold xylene insolubles in an amount of from more than 20 to 70% by weight based on the weight of whole polymers, and cold xylene solubles in an amount of 10 to 60% by weight based on the weight of whole polymers, and cold xylene solubles containing an α-olefin other than propylene in an amount of less than 20% by weight, and the composition being obtained by first producing the component (A) by polymerization and then producing the component (B) by polymerization. The propylene-based copolymer composition of the present invention exhibits not only excellent flexibility and transparency as well as heat resistance substantially identical to that of propylene homopolymer, but also excellent mechanical properties such as tensile strength and impact resistance.

6 Claims, No Drawings

PROPYLENE-BASED COPOLYMER COMPOSITION

BACKGROUND OF THE INVENTION

The present invention relates to a propylene-based copolymer composition, and more particularly, to a propylene-based copolymer composition which is excellent not only in heat resistance, flexibility and transparency, but also in mechanical properties such as tensile strength and impact resistance.

Propylene homopolymer has been extensively used in various applications such as injection-molded products, sheets, films and containers because of excellent heat resistance and stiffness thereof. Further, it has been positively studied to use polyolefins as alternate materials for building materials such as decorative sheets, and packages for foodstuffs, which have been conventionally made of polyvinyl chloride. For this reason, it has been required to develop polyolefins capable of exhibiting excellent flexibility, heat resistance and transparency. The propylene homopolymer is excellent in heat resistance but is deteriorated in flexibility and transparency. Also, polyethylene and ethylene/α-olefin copolymers are excellent in flexibility and transparency but are deteriorated in heat resistance. In consequence, these polyolefins are used only in limited applications.

In the above application fields, there have been conventionally used random copolymers produced by copolymerizing propylene with a small amount of ethylene and/or an α-olefin having 4 to 6 carbon atoms. These random copolymers are excellent in transparency but exhibit only a low flexibility. Further, the copolymers suffer from such an essential problem that the heat resistance thereof is considerably deteriorated.

As the method of improving the flexibility and transparency of polypropylene, for example in Japanese Patent Application Laid-Open (KOKAI) No. 8-100037(1996), there has been proposed a process for the production of propylene/ethylene block copolymers exhibiting excellent heat resistance and flexibility comprising producing a propylene homopolymer having a specific intrinsic viscosity ratio and then producing a copolymer having an ethylene content of 25 to 65% by weight by a two-stage polymerization. Also, in Japanese Patent Application Laid-Open (KOKAI) Nos. 10-316810(1998) and 11-92619(1999), there have been described propylene-based block copolymers containing random polypropylene as matrix and exhibiting good flexibility and transparency.

However, propylene-based polymer compositions which are well-balanced and improved in heat resistance, transparency and flexibility, have not been obtained until now.

As a result of the present inventors' earnest studies for solving the above problems, it has been found that by first producing a specific polymer component (A) comprising propylene as a main component, and then producing a specific copolymer component (B) comprising propylene and other α-olefin having not more than 8 carbon atoms and containing propylene and ethylene as essential components, the obtained propylene-based copolymer composition can exhibit not only good flexibility and transparency, but also excellent mechanical properties such as tensile strength and impact resistance. The present invention has been attained based on this finding.

SUMMARY OF THE INVENTION

An object of the present invention is to provide a propylene-based copolymer composition exhibiting not only excellent flexibility and transparency as well as heat resistance substantially identical to that of propylene homopolymer, but also excellent mechanical properties such as tensile strength and impact resistance.

To accomplish the aim, in a first aspect of the present invention, there is provided a propylene-based copolymer composition comprising:

10 to 60% by weight of a polymer component (A); and 40 to 90% by weight of a copolymer component (B), wherein said composition is obtained by producing the component (A) by first-stage polymerization and then producing the component (B) by second-stage polymerization, wherein said polymer component (A) comprises propylene as a main component and has an isotactic index of not less than 90%, and said copolymer component (B) comprises propylene and other α-olefin having not more than 8 carbon atoms and contains propylene and ethylene as essential components, said copolymer component containing a fraction insoluble in xylene at room temperature (hereinafter referred to as "cold xylene insolubles") in an amount of from more than 20 to 70% by weight based on the weight of whole polymers, and a fraction soluble in xylene at room temperature (hereinafter referred to as "cold xylene solubles") in an amount of 10 to 60% by weight based on the weight of whole polymers, and said cold xylene solubles containing an α-olefin other than propylene in an amount of less than 20% by weight.

In a second aspect of the present invention, there is provided the propylene-based copolymer composition according to the above aspect of the present invention, wherein said component (A) is a propylene homopolymer, and other α-olefin having not more than 8 carbon atoms of said component (B) is ethylene.

In a third aspect of the present invention, there is provided the propylene-based copolymer composition according to the above aspects of the present invention, which has a flexural modulus of 100 to 600 MPa, a haze of a 2 mm-thick sheet of not more than 70%; and a tensile strength at break of not less than 30 MPa.

In a fourth aspect of the present invention, there is provided the propylene-based copolymer composition according to the above aspects of the present invention, which satisfies the followings (1) to (4):

(1) a propylene content of 85 to 95% by weight;

(2) a content of the cold xylene solubles (hereinafter sometimes referred to merely as "CXS") in the whole polymers of 10 to 60% by weight;

(3) a content (wt. %) of the α-olefin other than propylene (hereinafter sometimes referred to merely as "αt") and the content of the cold xylene solubles (CXS), satisfying the following formula:

$$CXS > 5\alpha t - 25 \ (5 \leq \alpha t \leq 15);$$

and (4) a melting peak temperature of not less than 160° C.

DETAILED DESCRIPTION OF THE INVENTION

The present invention will be described in detail below.

The component (A) as one of constituents of the propylene-based copolymer composition according to the present invention, is a polymer comprising propylene as a main component and has an isotactic index of not less than 90%. The component (A) is usually composed of crystalline cold xylene insolubles and amorphous cold xylene solubles. The content of the cold xylene insolubles is substantially identical to the isotactic index.

Here, the polymer comprising propylene as a main component means such a polymer containing propylene-derived constituent units in an amount of usually not less than 70% by weight, preferably not less than 90% by weight, more preferably not less than 95% by weight based on the weight of the polymer. The most preferred polymer comprising propylene as a main component is a propylene homopolymer.

When the isotactic index of the component (A) is less than 90%, the obtained composition tends to be deteriorated in heat resistance.

The component (B) as the other constituent of the propylene-based copolymer composition according to the present invention, is a copolymer of propylene and other α-olefin having 2 to 8 carbon atoms, which comprises propylene and ethylene as essential components.

Examples of other α-olefins used in the present invention may include, in addition to ethylene as the essential component, 1-butene, 3-methyl-1-butene, 1-pentene, 4-methyl-1-pentene, 1-hexene, 1-octene or the like. The more preferred copolymers are those produced only from propylene and ethylene.

In accordance with the present invention, the copolymer component (B) contains cold xylene insolubles in an amount of from more than 20 to 70% by weight based on the weight of whole polymers, and cold xylene solubles in an amount of 10 to 60% by weight based on the weight of whole polymers, and further the cold xylene solubles contains the α-olefin other than propylene in an amount of less than 20% by weight. It is preferred that the content of the cold xylene insolubles is 25 to 60% by weight based on the weight of whole polymers; the content of the cold xylene solubles is 15 to 60% by weight on the weight of whole polymers; and the content of the α-olefin other than propylene in the cold xylene solubles is 10 to 18% by weight.

Meanwhile, the "whole polymers" used herein represent total polymers of the components (A) and (B).

When the component (B) contains the cold xylene insolubles in an amount of not more than 20% by weight, the obtained composition tends to be deteriorated in transparency. On the other hand, when the component (B) contains the cold xylene insolubles in an amount of more than 70% by weight, the obtained composition tends to be deteriorated in flexibility. In addition, when the component (B) contains the cold xylene solubles in an amount of less than 10% by weight, the obtained composition tends to be insufficient in flexibility. On the other hand, when the component (B) contains the cold xylene solubles in an amount of more than 60% by weight, the obtained composition tends to be deteriorated in heat resistance.

When the cold xylene solubles contains the α-olefin other than propylene in an amount of not less than 20% by weight, the obtained composition tends to be deteriorated in transparency.

The propylene-based copolymer composition of the present invention comprises 10 to 60% by weight of the component (A) and 40 to 90% by weight of the component (B), preferably 20 to 50% by weight of the component (A), and preferably 50 to 80% by weight of the component (B).

When the content of the component (A) is less than 10% by weight and the content of the component (B) is more than 90% by weight, the obtained composition tends to be deteriorated in heat resistance. On the other hand, when the content of the component (A) is more than 60% by weight and the content of the component (B) is less than 40% by weight, it becomes difficult to obtain a composition having good flexibility and transparency.

It is preferred that the propylene-based copolymer composition of the present invention has as a whole the followings (1) to (4).

(1) a propylene content of 85 to 95% by weight;
(2) a content of the cold xylene solubles (CXS) in the whole polymers of 10 to 60% by weight;
(3) a content of the α-olefin other than propylene (αt; unit: wt. %) and the content of the cold xylene solubles (CXS), satisfying the following formula:

$$CXS > 5\alpha t - 25 \ (5 \leq \alpha t \leq 15);$$

and (4) a melting peak temperature of not less than 160° C.

The propylene content and the content of the α-olefin other than propylene having 2 to 8 carbon atoms (αt) are in the range of 85 to 95% by weight and 5 to 15% by weight, respectively.

The propylene content is more preferably 87 to 95% by weight, still more preferably 88 to 92% by weight. The α-olefin content (αt) is more preferably 5 to 13% by weight, still more preferably 8 to 12% by weight. When the propylene content is more than 95% by weight and the α-olefin content (αt) is less than 5% by weight, the obtained composition may tend to be deteriorated in flexibility. On the other hand, when the propylene content is less than 85% by weight and the α-olefin content (αt) is more than 15% by weight, the obtained composition may tend to be deteriorated in transparency.

The content of the cold xylene solubles (CXS) contained in the propylene-based copolymer composition is preferably in the range of 10 to 60% by weight based on the weight of the whole polymer. When the CXS is less than 10% by weight, the obtained composition may tend to be insufficient in flexibility. On the other hand, when the CXS is more than 60% by weight, the obtained composition may tend to be deteriorated in heat resistance.

Also, it is preferred that the content of the α-olefin other than propylene having 2 to 8 carbon atoms (αt: wt. %) and the content of the cold xylene solubles (CXS: wt. %) satisfy the following formula:

$$CXS > 5\alpha t - 25 \ (5 \leq \alpha t \leq 15)$$

When the CXS does not satisfy the above formula, the obtained composition may tend to be deteriorated in transparency.

The propylene-based copolymer composition capable of satisfying the above properties exhibits a melting point substantially identical to that of propylene homopolymer, and a melting peak temperature as high as not less than 160° C. This indicates that the propylene copolymer has a high heat resistance.

The thus obtained propylene-based copolymer composition can exhibit a flexural modulus of usually 100 to 600 MPa, preferably 150 to 500 MPa when measured at 23° C. according to JIS K7203; a tensile strength at break of usually not less than 30 MPa when measured at 23° C. according to JIS K7113, and a haze of a 2 mm-thick sheet of usually not more than 70% when measured according to JIS K6717.

The propylene-based copolymer composition of the present invention is obtained by first producing the component (A) by polymerization and then producing the component (B) by polymerization in the presence of the obtained component (A).

For example, the composition is preferably produced by at least two-stage polymerization method. That is, the propylene homopolymer is produced by the first-stage polymerization, and then the copolymer of propylene and the α-olefin other than propylene having 2 to 8 carbon atoms which contains propylene and ethylene as essential components, is produced by the second or subsequent-stage polymerization, thereby obtaining such a composition having a propylene content of 85 to 95% by weight based on the weight of the whole polymer and an α-olefin content (αt) of 5 to 15% by weight based on the weight of the whole polymer.

The catalysts usable in the above successive polymerization are not particularly restricted. As the suitable catalysts, there may be used those catalysts comprising an organoaluminum compound and a solid component containing titanium atom, magnesium atom, halogen atom and an electron donating compound as essential ingredients.

As the organoaluminum compounds, there may be used those compounds represented by the following formula:

$$R^1_m AlX_{(3-m)}$$

wherein $R^1$ is a hydrocarbon group having 1 to 12 carbon atoms; X is a halogen atom; and m is a number of 1 to 3.

Examples of the organoaluminum compounds may include trialkyl aluminums such as trimethyl aluminum and triethyl aluminum; dialkyl aluminum halides such as dimethyl aluminum chloride and diethyl aluminum chloride; alkyl aluminum sesquihalides such as methyl aluminum sesquichloride and ethyl aluminum sesquichloride; alkyl aluminum dihalides such as methyl aluminum dichloride and ethyl aluminum dichloride; alkyl aluminum hydrides such as diethyl aluminum hydride; or the like.

As sources of the titanium atom contained in the solid component containing titanium atom, magnesium atom, halogen atom and an electron donating compound as essential ingredients, there may be exemplified those titanium compounds represented by the following formula:

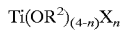

$$Ti(OR^2)_{(4-n)}X_n$$

wherein $R^2$ is a hydrocarbon group having 1 to 10 carbon atoms; X is a halogen atom; and n is a number of 0 to 4.

Among these titanium compounds, titanium tetrachloride, tetraethoxy titanium, tetrabutoxy titanium or the like are preferred.

Examples of magnesium compounds used as sources of the magnesium atom, may include dialkyl magnesium, magnesium dihalide, dialkoxy magnesium, alkoxy magnesium halide or the like. Among these magnesium compounds, magnesium dihalide is preferred. As the halogen atoms, there may be used fluorine, chlorine, bromine and iodine. Among these halogen atoms, chlorine is preferred. The halogen atom may be usually supplied from the above titanium compounds or magnesium compounds. However, the halogen atom may be supplied from other halogen sources such as aluminum halides, silicon halides, tungsten halides or the like.

As the electron donating compounds, there may exemplified oxygen-containing compounds such as alcohols, phenols, ketones, aldehydes, carboxylic acids, organic or inorganic acids and derivatives thereof; nitrogen-containing compounds such as ammonia, amines, nitriles and isocyanates; or the like. Among these electron donating compounds, inorganic acid esters, organic acid esters, organic acid halides, etc., are preferred, and silicic acid esters, phthalic acid esters, cellosolve acetate, phthalic halide, etc., are more preferred.

As the silicic acid esters, there may be exemplified organosilicon compounds represented by the following formula:

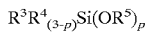

$$R^3 R^4_{(3-p)} Si(OR^5)_p$$

wherein $R^3$ is a branched aliphatic hydrocarbon residue having 3 to 20, preferably 4 to 10 carbon atoms, or a cyclic hydrocarbon residue having 5 to 20, preferably 6 to 10 carbon atoms; $R^4$ is a branched or linear aliphatic hydrocarbon residue having 1 to 20, preferably 1 to 10 carbon atoms; $R^5$ is an aliphatic hydrocarbon residue having 1 to 10, preferably 1 to 4 carbon atoms; and p is a number of 1 to 3.

Examples of the preferred organosilicon compounds may include tert-butyl-methyl-dimethoxysilane, tert-butyl-methyl-diethoxysilane, cyclohexyl-methyl-dimethoxysilane, cyclohexyl-methyl diethoxysilane or the like.

The propylene-based copolymer composition of the present invention can be produced by the following two-stage polymerization method. Namely, at the first stage, propylene or propylene and other α-olefin having 2 to 8 carbon atoms are supplied to conduct the polymerization of α-olefin containing propylene as a main component at a temperature of 50 to 150° C., preferably 50 to 100° C. under a propylene partial pressure of 0.5 to 4.5 MPa, preferably 1.0 to 3.5 MPa in the presence of the above-described catalyst, thereby producing the component (A). Then, at the second stage, propylene and ethylene, or propylene, ethylene and α-olefin having 4 to 8 carbon atoms are supplied to conduct the copolymerization between propylene and ethylene or between propylene, ethylene and the α-olefin at a temperature of 50 to 150° C., preferably 50 to 100° C. under propylene and ethylene partial pressures each being 0.3 to 4.5 MPa, preferably 0.5 to 3.5 MPa, in the presence of the above-described catalyst, thereby producing the component (B).

The above polymerization reactions may be conducted by either a batch process, a continuous process or a semi-batch process. The first-stage polymerization may be carried out in gas phase or liquid phase, and the second-stage or subsequent polymerization may also be carried out in gas phase or liquid phase, preferably in gas phase. The residence time at each stage is 0.5 to 10 hours, preferably 1 to 5 hours.

In the process of the present invention, the respective contents of the components (A) and (B) may be controlled by amounts of monomers to be polymerized at each stage, and the isotactic index of the component (A) may be controlled by kind of catalyst used, polymerization conditions (such as temperature and pressure) or composition of monomers charged. In addition, the cold xylene insolubles or cold xylene solubles of the component (B) may be controlled by composition of monomers charged at each stage, amounts of polymers produced at each stage and molecular weights thereof (the molecular weights can be adjusted, for example, by amount of hydrogen supplied), as well as by kind of catalyst selected.

Further, it is preferred that the α-olefin content (αt) is controlled by composition of monomers charged at each stage, and the CXS and the melting peak temperature are controlled by the ratio between amount of polymers produced at the first stage to that produced at the second and subsequent stages or molecular weights thereof which can be adjusted, for example, by amount of hydrogen supplied.

In the case where the polymers produced by the above methods cause problems such as sticky polymer particles, it is preferred that an active hydrogen-containing compound is added in an amount of 100 to 1,000 moles based on one mole of titanium atom contained in solid component of the catalyst or in an amount of 2 to 5 moles based on one mole of the organoaluminum compound contained in the catalyst in order to impart a good fluidity to the particles.

Examples of the active hydrogen-containing compounds may include water, alcohols, phenols, aldehydes, carboxylic acids, acid amides, ammonia, amines or the like.

The propylene-based copolymer composition of the present invention may further contain ethylene-based polymers such as ethylene/α-olefin copolymer and ethylene/vinyl acetate copolymer, propylene-based polymers such as propylene/α-olefin copolymer and syndiotactic polypropylene, and hydrogenated products of block copolymers of styrene and conjugated diene such as butadiene and isoprene, unless the addition thereof adversely affects the transparency or heat resistance of the obtained composition. Also, α-crystal nucleating agents ordinarily used for enhancing the transparency of propylene-based polymers may be added to the composition. Further, rubber softening agents may be blended in the composition in order to impart a good flexibility thereto.

Furthermore, the propylene-based copolymer composition of the present invention may contain, if required, various resins or rubbers other than those described above, fillers such as glass fibers, calcium carbonate, silica, talc, mica and clays, various additives such as antioxidants, light stabilizers, anti-static agents, lubricants, dispersants, neutralizers and flame retardants, and the like unless the addition thereof adversely affects the effects of the present invention.

The propylene-based copolymer composition of the present invention can be molded into a desired shape by various molding methods used for polyolefins such as extrusion molding method, injection molding method, compression molding method or the like, in order to produce single products, laminates with other materials or the like.

Thus, the propylene-based copolymer composition of the present invention exhibits not only good heat resistance, flexibility and transparency, but also excellent mechanical properties such as tensile strength at break and impact resistance.

EXAMPLES

The present invention will be described in more detail by reference to the following examples. However, these examples are only illustrative and not intended to limit the present invention thereto.

Production of Propylene-based Copolymer Composition

Propylene-based copolymer compositions used in Examples and Comparative Examples were produced by the following methods.

(1) Production of solid catalyst

A 50-liter reaction vessel equipped with a stirrer was purged with nitrogen, and then charged with 20 liters of dehydrated and deoxygenated n-heptane and then with 4 moles of magnesium chloride and 8 moles of tetrabutoxy titanium. The contents were reacted with each other at 95° C. for 2 hours, cooled to 40° C., and then mixed with 480 ml of methylhydropolysiloxane (viscosity: 20 centistoke). The resultant mixture was further reacted for 3 hours. Then, the obtained reaction solution was taken out of the reaction vessel, and the produced solid component was separated from the reaction solution and washed with n-heptane.

Successively, a stirrer-equipped reaction vessel of the same type as used above was charged with 15 liters of dehydrated and deoxygenated n-heptane and then with 3 moles of the obtained solid component (calculated as magnesium atom). Further, a mixed solution prepared by adding 8 moles of silicon tetrachloride to 25 ml of n-heptane was introduced into the reaction vessel at 30° C. for 30 minutes, and the resultant mixture was heated to 90° C. and reacted for one hour. Thereafter, the obtained reaction solution was taken out of the reaction vessel, and the obtained solid component was separated from the reaction solution and washed with n-heptane.

Furthermore, a stirrer-equipped reaction vessel of the same type as used above was charged with 5 liters of dehydrated and deoxygenated n-heptane and then with 250 g of the obtained silicon tetrachloride-treated titanium-containing solid component, 750 g of 1,5-hexadiene, 130 ml of tert-butyl-methyl-dimethoxysilane, 10 ml of divinyl dimethylsilane and 225 g of triethyl aluminum. The contents of the reaction vessel were contacted with each other at 30° C. for 2 hours. Then, the obtained reaction solution was taken out of the reaction vessel, and the obtained solid component was separated from the reaction solution and washed with n-heptane, thereby obtaining a solid catalyst.

The thus obtained solid catalyst had 2.97 g of pre-polymerized 1,5-hexadiene based on one gram of titanium-containing solid component.

(2) Two stage polymerization of propylene/propylene-ethylene

A 550-liter first stage reactor was continuously charged with propylene and triethyl aluminum, and then with the above-obtained solid catalyst in such an amount that the polymer production velocity was 20 kg/hour, at 70° C. under increased pressure (about 3.2 MPa at 70° C.). Further, the reactor was continuously charged with hydrogen as a molecular weight-controlling agent to conduct the first stage polymerization in a liquid phase.

Successively, the obtained polymer was passed through a propylene-purged vessel and then introduced into a second stage reactor having a capacity of 1,900 liters. Then, the second reactor was continuously charged with propylene and ethylene in amounts according to the composition of aimed copolymer so as to adjust the pressure thereof to 3.0 MPa at 60° C. Further, the reactor was continuously charged with hydrogen as a molecular weight-controlling agent and then with ethanol as an active hydrogen-containing compound in an amount of 200 moles based on one mole of titanium atom contained in the solid catalyst charged at the first stage, and in an amount of 2.5 moles based on one mole of triethyl aluminum. The contents of the reactor were reacted with each other in a gas phase. After the obtained polymer was continuously transferred into vessel, the reaction was stopped by introducing a water vapor-containing nitrogen gas into the reactor (second stage polymerization).

Examples 1 to 11 and Comparative Examples 1 to 5

According to the above-described method, polymer compositions having various contents of cold xylene solubles (CXS) and cold xylene insolubles (CXIS) were produced while controlling amounts of raw monomers charged (such as propylene).

Composition analysis:

The compositions composed of polymers obtained in Examples and Comparative Examples were measured to determine weight percentages of the components (A) and (B) based on whole polymers, weight percentages of cold xylene insolubles and cold xylene solubles in the respective components (A) and (B) based on whole polymers, isotactic index of the component (A), and content of α-olefin (ethylene) other than propylene in the cold xylene solubles. The results are shown in Tables 1 and 2.

(i) Weight percentages of components (A) and (B) based on whole composition:

The weight percentage of the component (B) based on whole polymers (hereinafter referred to as "B (%)") was calculated from the weight of whole polymers obtained and weights of propylene and ethylene fed to the second stage polymerization. The weight percentage of the component (A) based on whole polymers (hereinafter referred to as "A (%)") was calculated from the weight percentage of the component (B) according to the following formula:

$$A=100-B$$

(ii) Weight percentage of amorphous cold xylene solubles (CXS):

One gram of polymers produced by the first stage polymerization were sampled and added to 300 ml of xylene retained in an oil bath. The mixture was stirred at 140° C., i.e., at a boiling point of xylene to dissolve the polymers in xylene. The obtained solution was continuously stirred for one hour. Successively, while continuously stirring, the solution was cooled to 100° C. within one hour, and then transferred to a quenching oil bath where the solution was rapidly cooled to 23±2° C., thereby precipitating polymers. The solution was allowed to stand for not less than 20 minutes, and passed through a filter paper to separate precipitates therefrom by natural filtration. The obtained filtrate was evaporated to dryness using an evaporator to obtain solids. The obtained solids were dried at 120° C. under reduced pressure for 2 hours, and then allowed to stand for cooling to ordinary temperature to measure the weight of cold xylene solubles contained in the component (A). The thus obtained weight of the cold xylene solubles contained in the component (A) was compared with the initial weight of the sample to calculate the weight percentage of the cold xylene solubles contained in the component (A) (hereinafter referred to as "As" (wt. %)).

The weight of cold xylene solubles contained in whole polymers produced was measured by the same method as used above to calculate the weight percentage thereof (hereinafter referred to as "CXS(P)" (wt.%)).

Then, the weight percentage of cold xylene solubles contained in the component (A) based on whole polymers (hereinafter referred to as "CXS(A)" (wt. %)) was calculated according to the formula: As×A/100. Similarly, the weight percentage of cold xylene solubles contained in the component (B) based on whole polymers (hereinafter referred to as "CXS(B)" (wt. %)) was also calculated according to the formula: CXS(P)−CXS(A).

(iii) Isotactic index of component (A):

The polymers (component (A)) produced by the first stage polymerization were sampled by the same method as used in the above (ii), and subjected to Soxhlet's extraction using n-heptane. The weight of the obtained residues was measured to calculate the weight percentage (%) thereof based on the weight of the sample.

(4) Ethylene content of cold xylene solubles contained in component (B):

The cold xylene solubles contained in the polymers produced by the first stage polymerization in the above (ii) and the cold xylene solubles contained in whole polymers, were measured by $^{13}$C-NMR spectrum method as described in Kang-Bong Lee, et. al, "Polymer J.", 28, pp. 696-702 (1996), to determine ethylene contents of the respective cold xylene solubles (hereinafter referred to as "E(A)" and "E(P)" (wt. %), respectively). The ethylene content of cold xylene solubles contained in the component (B) is calculated according to the following formula:

$$[E(P)-E(A)\times(CXS(A)/CXS(P))]/[CXS(B)/CXS(P)]$$

Evaluation of polymers:

The melt flow rate (MFR) and density of the obtained propylene-based copolymer composition were measured by the following methods (1) and (2), respectively.

Also, the hardness, mechanical properties, haze, etc. of the obtained propylene-based copolymer composition were measured by the following methods (3) to (8) using a sample produced by the method described below.

That is, 0.05 part by weight of each of tetrakis[methylene-3-(3',5'-di-tert-butyl-4'-hydroxyphenyl) propionate]methane ("IRGANOX 1010" produced by Japan Ciba Geigy Co., Ltd.) and tris(2,4-di-tert-butyl phenyl)phosphite ("IRGAFOS" produced by Japan Ciba Geigy Co., Ltd.) as antioxidants, and 0.05 part by weight of zinc stearate as neutralizing agent were added to 100 parts by weight of the propylene-based copolymer composition. The resultant composition was melt-kneaded and extruded into pellets at a set temperature of 200° C. using a twin-screw extruder having a cylinder diameter of 45 mm ("PCM45" manufactured by Ikegai Tekko Co., Ltd.). Then, the obtained pellets were injection-molded using an injection molding machine ("N-100" manufactured by Nihon Seikosho Co., Ltd.) having a clamping pressure of 100 tons, at a hopper bottom temperature of 175° C., a cylinder temperature of 220° C., a nozzle temperature of 210° C. and a mold temperature of 40° C., thereby obtaining an injection-molded test sample. The test sample was measured to determine a melt flow rate (MFR), density, hardness, flexural modulus, tensile strength, impact strength, haze and melting peak temperature thereof by the following methods. The results are shown in Tables 1 and 2.

(1) The melt flow rate (MFR) was measured at 230° C. under a load of 21.18N according to JIS K7210.

(2) The density was measured by a water substitution method according to JIS K7112.

(3) The hardness was determined by measuring a type D duro-meter hardness according to JIS K7215.

(4) The thermal property (melting peak temperature) was measured at a temperature rise rate of 10° C./minute according to JIS K7121 using a differential scanning calorimeter (DSC; manufactured by Seiko Instruments Co., Ltd.).

(5) The flexural modulus and flexural strength were measured at 23° C. according to JIS K7203.

(6) The tensile properties such as tensile strength at yield point, tensile strength at break and tensile elongation at break, were measured at 23° C. and a pulling speed of 50 mm/minute by using a JIS dumbbell No. 2 according to JIS K7113.

(7) The impact strength was determined by measuring notched Izod impact strengths at 23° C. and 0° C. according to JIS K7110.

(8) The haze of the above test sample, i.e., the 2 mm-thick injection-molded sheet produced above for measurement of mechanical properties, was measured according to JIS K6717.

Evaluation of results

From the results shown in Table 1, the following facts were confirmed.

(I) In Comparative Examples 1 to 3 where the content of cold xylene insolubles in the component (B) and the ethylene content of the cold xylene solubles were out of the specified ranges according to the present invention, the obtained compositions all exhibited a high haze value and were insufficient in transparency.

(II) In Comparative Example 4 where the contents of the components (A) and (B) and the CXIS of the component (B) were out of the specified range according to the present invention, the obtained composition was insufficient in impact resistance.

Example 12 and Comparative Example 6

Preparation of film and bag

The compositions obtained in Example 10 and Comparative Example 4 were respectively molded into a tubular film having a lay flat width of 150 mm and a thickness of 250 μm by using a water-cooled inflation molding machine manufactured by Placo Co., Ltd. (die diameter: 100 mmφ; die lip: 3 mm; dice temperature: 200° C.). A test sample was cut from the tubular film, and heat-sealed at one open end thereof to form a bag. The bag was filled with 700 cc of pure water, and then heat-sealed at the other open end thereof to form a closed bag.

Transparency before and after high-temperature and high-pressure sterilization treatment:

The thus obtained bag was placed in a high-temperature and high-pressure cooking sterilization tester ("RCS/40RTGN-Model" manufactured by Hitachi Limited), and then pressurized while increasing the ambient temperature up to 121° C. at which the bag was then kept for 30 minutes so as to subject the bag to high-temperature and high-pressure sterilization treatment. After completion of the treatment, the bag was removed from the tester, and a 250 μm-thick film was cut from the bag. The haze of the cut film was compared with that before the treatment. The results are shown in Table 2. It was confirmed that the composition of the present invention still maintained a high transparency.

Drop test for bag:

The above bag was chilled at 4° C. for one day in a refrigerator. Then, the bag was dropped from a predetermined height within the refrigerator to measure the falling bag impact strength. The drop heights were set to 0.5 m, 1 m, 1.5 m and 2 m, and the bag was dropped three times at each height. The falling bag impact strength is expressed by the height causing breakage of the bag when being dropped therefrom. The results are shown in Table 2. The bag produced from the composition obtained in Comparative Example 4 was broken when being dropped from 0.5 m height. On the other hand, the bag produced from the composition obtained in Example 10 was free from breakage even when being dropped from 2 m height. Therefore, it was confirmed that the composition of the present invention had a high impact strength.

TABLE 1

|  | Example 1 | Example 2 | Example 3 |
|---|---|---|---|
| (A) component (wt %) | 27.4 | 46.5 | 40.1 |
| Cold xylene insolubles (wt %) | 27.2 | 46.2 | 39.9 |
| Cold xylene solubles (wt %) | 0.2 | 0.3 | 0.2 |
| Isotactic Index (%) | 98.8 | 98.1 | 98.6 |
| (B) component (wt %) | 72.6 | 53.5 | 59.9 |
| Cold xylene insolubles (wt %) | 32.8 | 23.4 | 34.3 |
| Cold xylene solubles (wt %) | 39.8 | 30.1 | 25.6 |
| Ethylene content in solubles (wt %) | 15.7 | 16.9 | 14.2 |
| α (wt %) | — | — | — |
| CXS (wt %) | — | — | — |
| 5α-25 | — | — | — |
| MFR (dg/min) | 3.1 | 2.0 | 1.5 |
| Density (g/cm³) | 0.8863 | 0.8911 | 0.8923 |
| Tensile strength at yield point (MPa) | 11.8 | 14.6 | 16.4 |
| Tensile strength at break (MPa) | 34.8 | 40.5 | 40.6 |
| Tensile elongation at break (%) | 1,000 | 990 | 986 |
| Flexural modulus (MPa) | 265 | 383 | 426 |
| Flexural strength (MPa) | 9.7 | 13.0 | 14.2 |
| Izod (23° C.) (kJ/m²) | NB | NB | NB |
| Izod (0° C.) (kJ/m²) | NB | NB | NB |
| Haze (%) | 57.2 | 56.6 | 58.3 |
| DSC melting peak (° C.) | 163.8 | 164.7 | 164.2 |

|  | Example 4 | Example 5 | Example 6 |
|---|---|---|---|
| (A) component (wt %) | 33.6 | 37.5 | 25.9 |
| Cold xylene insolubles (wt %) | 33.3 | 37.2 | 25.7 |
| Cold xylene solubles (wt %) | 0.3 | 0.3 | 0.2 |
| Isotactic Index (%) | 98.1 | 98.2 | 98.4 |
| (B) component (wt %) | 66.4 | 62.5 | 74.1 |
| Cold xylene insolubles (wt %) | 35.9 | 43.2 | 51.3 |
| Cold xylene solubles (wt %) | 30.5 | 19.3 | 22.8 |
| Ethylene content in solubles (wt %) | 14.1 | 11.2 | 11.1 |
| α (wt %) | — | — | — |
| CXS (wt %) | — | — | — |
| 5α-25 | — | — | — |
| MFR (dg/min) | 1.6 | 2.7 | 2.5 |
| Density (g/cm³) | 0.8907 | 0.8955 | 0.8931 |
| Tensile strength at yield point (MPa) | 14.6 | 19.8 | 17.9 |
| Tensile strength at break (MPa) | 40.4 | 39.6 | 39.2 |
| Tensile elongation at break (%) | 1,004 | 888 | 958 |
| Flexural modulus (MPa) | 350 | 551 | 465 |
| Flexural strength (MPa) | 12.4 | 18.6 | 16.0 |
| Izod (23° C.) (kJ/m²) | NB | NB | NB |
| Izod (0° C.) (kJ/m²) | NB | 8.3 | 10.8 |
| Haze (%) | 53.1 | 64.2 | 61.0 |
| DSC melting peak (° C.) | 164.2 | 163.8 | 163.8 |

|  | Example 7 | Example 8 | Example 9 |
|---|---|---|---|
| (A) component (wt %) | 47.4 | 40.6 | 29.2 |
| Cold xylene insolubles (wt %) | 47.0 | 40.4 | 28.9 |
| Cold xylene solubles (wt %) | 0.4 | 0.2 | 0.3 |
| Isotactic Index (%) | 98.3 | 98.6 | 98.5 |
| (B) component (wt %) | 52.6 | 59.4 | 70.8 |
| Cold xylene insolubles (wt %) | 22.8 | 24.9 | 25.3 |
| Cold xylene solubles (wt %) | 29.8 | 34.5 | 45.5 |
| Ethylene content in solubles (wt %) | 18.1 | 18.7 | 18.3 |
| α (wt %) | 9.0 | 10.2 | 12.1 |
| CXS (wt %) | 30.2 | 34.7 | 45.8 |
| 5α-25 | 20.0 | 26.0 | 35.5 |
| MFR (dg/min) | 2.6 | 1.6 | 1.4 |

TABLE 1-continued

|  | | | |
|---|---|---|---|
| Density (g/cm³) | 0.8916 | 0.8892 | 0.8860 |
| Tensile strength at yield point (MPa) | 14.9 | 12.8 | 10.3 |
| Tensile strength at break (MPa) | 38.4 | 36.0 | 33.7 |
| Tensile elongation at break (%) | 976 | 941 | 989 |
| Flexural modulus (MPa) | 403 | 318 | 212 |
| Flexural strength (MPa) | 13.7 | 11.0 | 8.5 |
| Izod (23° C.) (kJ/m²) | NB | NB | NB |
| Izod (0° C.) (kJ/m²) | NB | NB | NB |
| Haze (%) | 57.0 | 51.1 | 43.9 |
| DSC melting peak (° C.) | 164.7 | 164.2 | 164.2 |

|  | Example 10 | Example 11 | Comparative Example 1 |
|---|---|---|---|
| (A) component (wt %) | 26.8 | 23.1 | 48.9 |
| Cold xylene insolubles (wt %) | 26.4 | 22.7 | 48.6 |
| Cold xylene solubles (wt %) | 0.4 | 0.4 | 0.3 |
| Isotactic Index (%) | 98.2 | 98.4 | 98.1 |
| (B) component (wt %) | 73.2 | 76.9 | 51.1 |
| Cold xylene insolubles (wt %) | 39.1 | 53 | 19.5 |
| Cold xylene solubles (wt %) | 34.1 | 23.9 | 31.6 |
| Ethylene content in solubles (wt %) | 14.6 | 11.5 | 22.2 |
| αt (wt %) | 10.1 | 8.5 | — |
| CXS (wt %) | 34.5 | 24.3 | — |
| 5αt-25 | 25.5 | 17.5 | — |
| MFR (dg/min) | 1.5 | 3.2 | 3.6 |
| Density (g/cm³) | 0.8894 | 0.8928 | 0.8860 |
| Tensile strength at yield point (MPa) | 13.2 | 17.1 | 11.9 |
| Tensile strength at break (MPa) | 38.1 | 38.6 | 31.7 |
| Tensile elongation at break (%) | 985 | 968 | 948 |
| Flexural modulus (MPa) | 290 | 432 | 354 |
| Flexural strength (MPa) | 10.7 | 15.1 | 10.9 |
| Izod (23° C.) (kJ/m²) | NB | NB | NB |
| Izod (0° C.) (kJ/m²) | NB | 10.9 | NB |
| Haze (%) | 48.3 | 60.1 | 82.9 |
| DSC melting peak (° C.) | 163.8 | 163.8 | 163.8 |

|  | Comparative Example 2 | Comparative Example 3 |
|---|---|---|
| (A) component (wt %) | 44.1 | 43.6 |
| Cold xylene insolubles (wt %) | 43.8 | 42.8 |
| Cold xylene solubles (wt %) | 0.3 | 0.8 |
| Isotactic Index (%) | 98.1 | 98.3 |
| (B) component (wt %) | 55.9 | 56.4 |
| Cold xylene insolubles (wt %) | 21.5 | 10.8 |
| Cold xylene solubles (wt %) | 34.4 | 45.6 |
| Ethylene content in solubles (wt %) | 22.4 | 23.8 |
| αt (wt %) | 12.3 | 17.3 |
| CXS (wt %) | 34.7 | 46.4 |
| 5αt-25 | 36.5 | 61.5 |
| MFR (dg/min) | 2.8 | 2.1 |
| Density (g/cm³) | 0.8848 | 0.8820 |
| Tensile strength at yield point (MPa) | 10.7 | 10.1 |
| Tensile strength at break (MPa) | 32.7 | 20.3 |
| Tensile elongation at break (%) | 949 | 870 |
| Flexural modulus (MPa) | 318 | 347 |
| Flexural strength (MPa) | 9.7 | 10.0 |
| Izod (23° C.) (kJ/m²) | NB | NB |
| Izod (0° C.) (kJ/m²) | NB | NB |
| Haze (%) | 80.8 | 91.8 |
| DSC melting peak (° C.) | 164.2 | 164.3 |

|  | Comparative Example 4 | Comparative Example 5 |
|---|---|---|
| (A) component (wt %) | 8.3 | 52.6 |
| Cold xylene insolubles (wt %) | 8.1 | 47.8 |
| Cold xylene solubles (wt %) | 0.2 | 4.8 |
| Isotactic Index (%) | 96.5 | 92.3 |
| (B) component (wt %) | 91.7 | 47.4 |
| Cold xylene insolubles (wt %) | 79.3 | 8.5 |
| Cold xylene solubles (wt %) | 12.4 | 38.9 |
| Ethylene content in solubles (wt %) | 5.5 | 22.5 |
| αt (wt %) | 5.5 | 11.8 |
| CXS (wt %) | 12.6 | 43.7 |
| 5αt-25 | 2.5 | 34.0 |
| MFR (dg/min) | 3.1 | 2.2 |
| Density (g/cm³) | 0.8902 | 0.8835 |
| Tensile strength at yield point (MPa) | 16.8 | 10.0 |
| Tensile strength at break (MPa) | 30.7 | 26.0 |
| Tensile elongation at break (%) | 840 | 890 |
| Flexural modulus (MPa) | 482 | 320 |
| Flexural strength (MPa) | 17.8 | 11.0 |
| Izod (23° C.) (kJ/m²) | 14.5 | NB |
| Izod (0° C.) (kJ/m²) | 3.7 | NB |
| Haze (%) | 49.0 | 66.7 |
| DSC melting peak (° C.) | 134.6 | 152.5 |

TABLE 2

|  | Example 12 | Comparative Example 6 |
|---|---|---|
| Propylene-based copolymer composition | Example 10 | Comparative Example 4 |
| Haze before A.C. sterilization (%) | 12 | 15 |
| Haze after A.C. sterilization (%) | 14 | 21 |
| Falling bag impact strength (m) | >2 | <0.5 |

What is claimed is:

1. A propylene-based copolymer composition comprising: 10 to 60% by weight of a polymer component (A); and 40 to 90% by weight of a copolymer component (B), wherein said polymer composition is obtained by a two-stage polymerization process comprising a first producing the component (A) by polymerization and then producing the component (B) by polymerization, wherein said polymer component (A) comprises a polypropylene homopolymer and has an isotactic index of not less than 90%, and said copolymer component (B) comprises propylene and other α-olefin having not more than 8 carbon atoms, and contains propylene and ethylene as essential components, said copolymer component containing cold xylene insolubles in an amount of from more than 20 to 70% by weight based on the weight of whole polymers, and cold xylene solubles in an amount of 10 to 60% by weight based on the weight of whole polymers, and said cold xylene solubles containing an α-olefin other than propylene in an amount of less than 20% by weight.

2. A propylene-based copolymer composition according to claim 1, wherein other α-olefin having not more than 8 atoms contained in the component (B) is ethylene.

3. A propylene-based copolymer composition according to claim 1, which further satisfies the followings (1) to (4):

(1) a propylene content of 85 to 95% by weight;

(2) a content of cold xylene solubles (CXS) in the whole polymers, of 10 to 60% by weight;

(3) a content of the α-olefin other than propylene (% by weight: αt) and the content of the cold xylene solubles (CXS), satisfying the following equation:

$$CXS > 5\alpha t - 25 \ (5 \leq \alpha t \leq 15);$$

and (4) a melting peak temperature of not less than 160° C.

4. A propylene-based copolymer composition according to claim 3, which is produced only from propylene and ethylene.

5. A propylene-based copolymer composition according to claim 1, having a flexural modulus of 100 to 600 MPa; a haze of a 2 mm-thick sheet of not more than 70%; and a tensile strength at break of not less than 30 MPa.

6. A flexible container made of a propylene-based copolymer composition comprising:

10 to 60% by weight of a polymer component (A); and 40 to 90% weight of a polymer component (B), wherein said polymer composition is obtained by a two-stage polymerization process comprising a first producing the component (A) by polymerization and then producing the component (B) by polymerization, wherein said polymer component (A) comprises a polypropylene homopolymer and has an isotactic index of not less than 90%, and said copolymer component (B) comprises propylene and other α-olefin having not more than 8 carbon atoms, and contains propylene and ethylene as essential components, said copolymer component containing cold xylene insolubles in an amount of from more than 20 to 70% by weight based on the weight of whole polymers, and cold xylene solubles in an amount of 10 to 60% by weight based on the weight of whole polymers, and said cold xylene solubles containing an α-olefin other than propylene in an amount of less than 20% by weight.

* * * * *